(12) United States Patent
Shahed et al.

(10) Patent No.: US 7,182,075 B2
(45) Date of Patent: Feb. 27, 2007

(54) EGR SYSTEM

(75) Inventors: Syed M. Shahed, Rancho Palos Verdes, CA (US); Gregory J. Hampson, Stillwater, NY (US)

(73) Assignee: Honeywell International Inc., Morristown, NJ (US)

( * ) Notice: Subject to any disclaimer, the term of this patent is extended or adjusted under 35 U.S.C. 154(b) by 72 days.

(21) Appl. No.: 11/005,983

(22) Filed: Dec. 7, 2004

(65) Prior Publication Data

US 2006/0117750 A1 Jun. 8, 2006

(51) Int. Cl.
F02M 25/07 (2006.01)
F16K 31/04 (2006.01)

(52) U.S. Cl. ............ 123/568.21; 60/602; 251/129.11
(58) Field of Classification Search ........... 123/568.11, 123/568.21–568.26; 251/129.11; 60/602
See application file for complete search history.

(56) References Cited

U.S. PATENT DOCUMENTS

| | | | |
|---|---|---|---|
| 3,744,461 A | 7/1973 | Davis | |
| 4,005,578 A | 2/1977 | McInerney | |
| 4,055,158 A | 10/1977 | Marsee | |
| 4,252,098 A | 2/1981 | Tomczak et al. | |
| 4,383,441 A | 5/1983 | Willis et al. | |
| 4,426,982 A | 1/1984 | Lehner et al. | |
| 4,438,497 A | 3/1984 | Willis et al. | |
| 4,456,883 A | 6/1984 | Bullis et al. | |
| 4,485,794 A | 12/1984 | Kimberley et al. | |
| 4,554,943 A * | 11/1985 | Claney et al. | ............... 137/242 |
| 4,601,270 A | 7/1986 | Kimberley et al. | |
| 4,653,449 A | 3/1987 | Kamei et al. | |
| 5,044,337 A | 9/1991 | Williams | |
| 5,076,237 A | 12/1991 | Hartman et al. | |

(Continued)

FOREIGN PATENT DOCUMENTS

WO   WO 02/101208   12/2002

(Continued)

OTHER PUBLICATIONS

"SCR, 400-csi. Coated Catalyst," Leading NOx Control Technologies Status Summary, 1 page prior to the filing date of the present application.

(Continued)

*Primary Examiner*—Stephen K. Cronin
*Assistant Examiner*—Arnold Castro
(74) *Attorney, Agent, or Firm*—Kris T. Fredrick

(57) ABSTRACT

A flow control mechanism connected to the intake and exhaust systems of an engine. The mechanism may achieve recirculation of exhaust gases despite varying differential pressures or delta pressures between the systems, particularly since intake pressures may often exceed exhaust pressures. Pressure sensors may be situated proximate to the input and output of the flow control mechanism. There may a flow sensor proximate to the flow control mechanism. Cylinder pressure or pulse sensors may be situated in or about the engine. A processor may be connected to various sensors and provide prompt active control of a valve or like device in the flow control mechanism. Such valve may operate sufficiently quickly so as to prevent backflow from the intake system into the exhaust system upon sudden pressure changes in the systems. The quickness of the active valve control may also permit recirculating stipulated amounts of exhaust gas to each cylinder.

9 Claims, 3 Drawing Sheets

U.S. PATENT DOCUMENTS

| | | |
|---|---|---|
| 5,089,236 A | 2/1992 | Clerc |
| 5,108,716 A | 4/1992 | Nishizawa |
| 5,123,397 A | 6/1992 | Richeson |
| 5,233,829 A | 8/1993 | Komatsu |
| 5,282,449 A | 2/1994 | Takahashi et al. |
| 5,349,816 A | 9/1994 | Sanbayashi et al. |
| 5,365,734 A | 11/1994 | Takeshima |
| 5,398,502 A | 3/1995 | Watanabe |
| 5,452,576 A | 9/1995 | Hamburg et al. |
| 5,477,840 A | 12/1995 | Neumann |
| 5,560,208 A | 10/1996 | Halimi et al. |
| 5,570,574 A | 11/1996 | Yamashita et al. |
| 5,609,139 A | 3/1997 | Ueda et al. |
| 5,611,198 A | 3/1997 | Lane et al. |
| 5,690,086 A | 11/1997 | Kawano et al. |
| 5,692,478 A | 12/1997 | Nogi et al. |
| 5,746,183 A | 5/1998 | Parke et al. |
| 5,765,533 A | 6/1998 | Nakajima |
| 5,771,867 A | 6/1998 | Amstutz et al. |
| 5,785,030 A | 7/1998 | Paas |
| 5,788,004 A | 8/1998 | Friedmann et al. |
| 5,846,157 A | 12/1998 | Reinke et al. |
| 5,893,092 A | 4/1999 | Driscoll |
| 5,942,195 A | 8/1999 | Lecea et al. |
| 5,964,199 A | 10/1999 | Atago et al. |
| 5,974,788 A | 11/1999 | Hepburn et al. |
| 6,029,626 A | 2/2000 | Bruestle |
| 6,035,640 A | 3/2000 | Kolmanovsky et al. |
| 6,048,620 A | 4/2000 | Zhong |
| 6,055,810 A | 5/2000 | Borland et al. |
| 6,058,700 A | 5/2000 | Yamashita et al. |
| 6,067,800 A | 5/2000 | Kolmanovsky et al. |
| 6,076,353 A | 6/2000 | Freudenberg et al. |
| 6,095,127 A * | 8/2000 | Kolmanovsky et al. ..... 123/676 |
| 6,105,365 A | 8/2000 | Deeba et al. |
| 6,153,159 A | 11/2000 | Engeler et al. |
| 6,161,528 A | 12/2000 | Akao et al. |
| 6,170,259 B1 | 1/2001 | Boegner et al. |
| 6,171,556 B1 | 1/2001 | Burk et al. |
| 6,178,743 B1 | 1/2001 | Hirota et al. |
| 6,178,749 B1 | 1/2001 | Kolmanovsky et al. |
| 6,216,083 B1 | 4/2001 | Ulyanov et al. |
| 6,237,330 B1 | 5/2001 | Takahashi et al. |
| 6,242,873 B1 | 6/2001 | Drozdz et al. |
| 6,263,672 B1 | 7/2001 | Roby et al. |
| 6,273,060 B1 | 8/2001 | Cullen |
| 6,279,551 B1 | 8/2001 | Iwano et al. |
| 6,312,538 B1 | 11/2001 | Latypov et al. |
| 6,321,538 B2 | 11/2001 | Hasler |
| 6,338,245 B1 | 1/2002 | Shimoda et al. |
| 6,347,619 B1 | 2/2002 | Whiting et al. |
| 6,360,159 B1 | 3/2002 | Miller et al. |
| 6,360,541 B2 | 3/2002 | Waszkiewicz et al. |
| 6,360,732 B1 | 3/2002 | Bailey et al. |
| 6,379,281 B1 | 4/2002 | Collins et al. |
| 6,425,371 B2 | 7/2002 | Majima |
| 6,427,436 B1 | 8/2002 | Allansson et al. |
| 6,431,160 B1 | 8/2002 | Sugiyama et al. |
| 6,463,733 B1 | 10/2002 | Asik et al. |
| 6,463,734 B1 | 10/2002 | Tamura et al. |
| 6,470,682 B2 | 10/2002 | Gray, Jr. |
| 6,470,866 B2 | 10/2002 | Cook |
| 6,502,391 B1 | 1/2003 | Hirota et al. |
| 6,512,974 B2 | 1/2003 | Houston et al. |
| 6,546,329 B2 | 4/2003 | Bellinger |
| 6,560,528 B1 | 5/2003 | Gitlin et al. |
| 6,571,191 B1 | 5/2003 | York et al. |
| 6,579,206 B2 | 6/2003 | Liu et al. |
| 6,598,851 B2 * | 7/2003 | Schiavone et al. ..... 251/129.11 |
| 6,612,293 B2 | 9/2003 | Schweinzer et al. |
| 6,625,978 B1 | 9/2003 | Eriksson et al. |
| 6,629,408 B1 | 10/2003 | Murakami et al. |
| 6,647,710 B2 | 11/2003 | Nishiyama et al. |
| 6,647,971 B2 | 11/2003 | Vaughan et al. |
| 6,671,603 B2 | 12/2003 | Cari et al. |
| 6,672,060 B1 | 1/2004 | Buckland et al. |
| 6,679,050 B1 | 1/2004 | Takahashi et al. |
| 6,687,597 B2 | 2/2004 | Sulatisky et al. |
| 6,705,084 B2 | 3/2004 | Allen et al. |
| 6,726,174 B2 * | 4/2004 | Bareis et al. ............... 251/205 |
| 6,742,330 B2 | 6/2004 | Genderen |
| 6,758,037 B2 | 7/2004 | Terada et al. |
| 6,789,533 B1 | 9/2004 | Hashimoto et al. |
| 6,823,667 B2 | 11/2004 | Braun et al. |
| 6,823,675 B2 | 11/2004 | Brunell et al. |
| 6,826,903 B2 | 12/2004 | Yahata et al. |
| 6,827,061 B2 | 12/2004 | Nytomt et al. |
| 2001/0002591 A1 | 6/2001 | Majima |
| 2002/0029564 A1 | 3/2002 | Roth et al. |
| 2002/0056434 A1 | 5/2002 | Flamig-Vetter et al. |
| 2002/0098975 A1 | 7/2002 | Kimura et al. |
| 2002/0170550 A1 | 11/2002 | Mitsutani |
| 2002/0173919 A1 | 11/2002 | Moteki et al. |
| 2002/0184879 A1 | 12/2002 | Lewis |
| 2002/0194835 A1 | 12/2002 | Bromberg et al. |
| 2003/0022752 A1 | 1/2003 | Liu et al. |
| 2003/0041590 A1 | 3/2003 | Kitajima et al. |
| 2003/0089101 A1 | 5/2003 | Tanaka et al. |
| 2003/0101713 A1 | 6/2003 | Dalla Betta et al. |
| 2003/0120410 A1 | 6/2003 | Cari et al. |
| 2003/0143957 A1 | 7/2003 | Lyon |
| 2003/0145837 A1 | 8/2003 | Esteghlal et al. |
| 2003/0150422 A1 | 8/2003 | Huh |
| 2003/0172907 A1 | 9/2003 | Nytomt et al. |
| 2003/0200016 A1 | 10/2003 | Spillane et al. |
| 2003/0221679 A1 | 12/2003 | Surnilla |
| 2003/0225507 A1 | 12/2003 | Tamura |
| 2004/0006973 A1 | 1/2004 | Makki et al. |
| 2004/0007211 A1 | 1/2004 | Kobayashi |
| 2004/0007217 A1 | 1/2004 | Poola et al. |
| 2004/0025837 A1 | 2/2004 | Hunt et al. |
| 2004/0034460 A1 | 2/2004 | Folkerts et al. |
| 2004/0040283 A1 | 3/2004 | Yasui et al. |
| 2004/0040287 A1 | 3/2004 | Beutel et al. |
| 2004/0050037 A1 | 3/2004 | Betta et al. |
| 2004/0055278 A1 | 3/2004 | Miyoshi et al. |
| 2004/0060284 A1 | 4/2004 | Roberts, Jr. et al. |
| 2004/0074226 A1 | 4/2004 | Tanaka |
| 2004/0089279 A1 | 5/2004 | McLaughlin et al. |
| 2004/0118117 A1 | 6/2004 | Hartman et al. |
| 2004/0128058 A1 | 7/2004 | Andres et al. |
| 2004/0129259 A1 | 7/2004 | Mitsutani |
| 2004/0134464 A1 | 7/2004 | Mogi |
| 2004/0135584 A1 | 7/2004 | Nagy et al. |
| 2004/0139735 A1 | 7/2004 | Zhu |
| 2004/0139951 A1 | 7/2004 | Fisher et al. |
| 2004/0249558 A1 | 12/2004 | Meaney |

FOREIGN PATENT DOCUMENTS

| | | |
|---|---|---|
| WO | WO 2004/027230 | 4/2004 |

OTHER PUBLICATIONS

Advanced Petroleum-Based Fuels-Diesel Emissions Control (APBF-DEC) Project, "Quarterly Update," No. 7, 6 pages, Fall 2002.

Allanson, et al., "Optimizing the Low Temperature Performance and Regeneration Efficiency of the Continuously Regenerating Diesel Particulate Filter System," SAE Paper No. 2002-01-0428, 8 pages, Mar. 2002.

Amstuz, et al., "EGO Sensor Based Robust Output Control of EGR in Diesel Engines," IEEE TCST, vol. 3, No. 1, 12 pages, Mar. 1995.

Bemporad, et al., "Explicit Model Predicitive Control," 1 page, prior to filing date of present application.

Borrelli, "Constrained Optimal Control of Linear and Hybrid Systems," Lecture Notes in Control and Information Sciences, vol. 290, 2003.

Catalytica Energy Systems, "Innovative NOx Reduction Solutions for Diesel Engines," 13 pages, 3rd Quarter, 2003.

Chatterjee, et al. "Catalytic Emission Control for Heavy Duty Diesel Engines," JM, 46 pages, prior to filing date of present application.

Delphi, Delphi Diesel NOx Trap (DNT), 3 pages, Feb. 2004.

GM "Advanced Diesel Technology and Emissions," powertrain technologies—engines, 2 pages, prior to filing date of present application.

Guzzella, et al., "Control of Diesel Engines," IEEE Control Systems Magazine, pp. 53-71, Oct. 1998.

Havelena, "Componentized Architecture for Advanced Process Management," Honeywell International, 42 pages, 2004.

Hiranuma, et al., "Development of DPF System for Commercial Vehicle—Basic Characteristic and Active Regeneration Performance," SAE Paper No. 2003-01-3182, Mar. 2003.

Honeywell, "Profit Optimizer A Distributed Quadratic Program (DQP) Concepts Reference," 48 pages, prior to filing date of present application.

http://www.not2fast.wryday.com/turbo/glossary/turbo_glossary.shtml, "Not2Fast: Turbo Glossary," 22 pages, printed Oct. 1, 2004.

http://www.tai-cwv.com/sbl106.0.html, "Technical Overview—Advanced Control Solutions," 6 pages, printed Sep. 9, 2004.

Kelly, et al., "Reducing Soot Emissions from Diesel Engines Using One Atmosphere Uniform Glow Discharge Plasma," SAE Paper No. 2003-01-1183, Mar. 2003.

Kolmanovsky, et al., "Issues in Modeling and Control of Intake Flow in Variable Geometry Turbocharged Engines", 18th IFIP Conf. System Modeling and Optimization, pp. 436-445, Jul. 1997.

Kulhavy, et al. "Emerging Technologies for Enterprise Optimization in the Process Industries," Honeywell, 12 pages, Dec. 2000.

Locker, et al., "Diesel Particulate Filter Operational Characterization," Corning Incorporated, 10 pages, prior to filing date of present application.

Lu "Challenging Control Problems and Engineering Technologies in Enterprise Optimization," Honeywell Hi-Spec Solutions, 30 pages, Jun. 4-6, 2001.

Moore, "Living with Cooled-EGR Engines," Prevention Illustrated, 3 pages, Oct. 3, 2004.

National Renewable Energy Laboratory (NREL), "Diesel Emissions Control—Sulfur Effects Project (DECSE) Summary of Reports," U.S. Department of Energy, 19 pages, Feb. 2002.

Salvat, et al., "Passenger Car Serial Application of a Particulate Filter System on a Common Rail Direct Injection Engine," SAE Paper No. 2000-01-0473, 14 pages, Feb. 2000.

Shamma, et al. "Approximate Set-Valued Obeservers for Nonlinear Systems," IEEE Transactions on Automatic Control, vol. 42, No. 5, May 1997.

Soltis, "Current Status of NOx Sensor Development," Workshop on Sensor Needs and Requirements for PEM Fuel Cell Systems and Direct-Injection Engines, 9 pages, Jan. 25-26, 2000.

Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.

Storset, et al., "Air Charge Estimation for Turbocharged Diesel Engines," vol. 1 Proceedings of the American Control Conference, 8 pages, Jun. 28-30, 2000.

The MathWorks, "Model-Based Calibration Toolbox 2.1 Calibrate complex powertrain systems," 4 pages, printed prior to filing date of present application.

The MathWorks, "Model-Based Calibration Toolbox 2.1.2," 2 pages, prior to filing date of present application.

Theiss, "Advanced Reciprocating Engine System (ARES) Activities at the Oak Ridge National Lab (ORNL), Oak Ridge National Laboratory," U.S. Department of Energy, 13 pages, Apr. 14, 2004.

Zenlenka, et al., "An Active Regeneration as a Key Element for Safe Particulate Trap Use," SAE Paper No. 2001-0103199, 13 pages, Feb. 2001.

* cited by examiner

EGR SYSTEM

BACKGROUND

The present invention relates to internal combustion engines, and particularly to exhaust gas recirculation (EGR) systems in engines. More particularly, the invention relates to more effective recirculation of exhaust gases.

Spark ignition engines often use catalytic converters and oxygen sensors to help control engine emissions. A gas pedal is typically connected to a throttle that meters air into engine. That is, stepping on the pedal directly opens the throttle to allow more air into the engine. Oxygen sensors are often used to measure the oxygen level of the engine exhaust, and provide feed back to a fuel injector control to maintain the desired air/fuel ratio (AFR), typically close to a stoichiometric air-fuel ratio to achieve stoichiometric combustion. Stoichiometric combustion can allow three-way catalysts to simultaneously remove hydrocarbons, carbon monoxide, and oxides of nitrogen (NOx) in attempt to meet emission requirements for the spark ignition engines.

Compression ignition engines (e.g., diesel engines) have been steadily growing in popularity. Once reserved for the commercial vehicle markets, diesel engines are now making real headway into the car and light truck markets. Partly because of this, federal regulations were passed requiring decreased emissions in diesel engines.

Many diesel engines now employ turbochargers for increased efficiency. In such systems, and unlike most spark ignition engines, the pedal is not directly connected to a throttle that meters air into engine. Instead, a pedal position is used to control the fuel rate provided to the engine by adjusting a fuel "rack", which allows more or less fuel per fuel pump shot. The air to the engine is typically controlled by the turbocharger, often a variable nozzle turbocharger (VNT) or waste-gate turbocharger.

Traditional diesel engines can suffer from a mismatch between the air and fuel that is provided to the engine, particularly since there is often a time delay between when the operator moves the pedal, i.e., injecting more fuel, and when the turbocharger spins-up to provide the additional air required to produced the desired air-fuel ratio. To shorten this "turbo-lag", a throttle position sensor is often added and fed back to the turbocharger controller to increase the natural turbo acceleration, and consequently the air flow to the engine.

The pedal position is often used as an input to a static map, which is used in the fuel injector control loop. Stepping on the pedal increases the fuel flow in a manner dictated by the static map. In some cases, the diesel engine contains an air-fuel ratio (AFR) estimator, which is based on input parameters such as fuel injector flow and intake manifold air flow, to estimate when the AFR is low enough to expect smoke to appear in the exhaust, at which point the fuel flow is reduced. The airflow is often managed by the turbocharger, which provides an intake manifold pressure and an intake manifold flow rate for each driving condition.

In diesel engines, there are typically no sensors in the exhaust stream analogous to that found in spark ignition engines. Thus, control over the combustion is often performed in an "open-loop" manner, which often relies on engine maps to generate set points for the intake manifold parameters that are favorable for acceptable exhaust emissions. As such, engine air-side control is often an important part of overall engine performance and in meeting exhaust emission requirements. In many cases, control of the turbocharger and EGR systems are the primary components in controlling the emission levels of a diesel engine.

Most diesel engines do not have emissions component sensors. One reason for the lack of emissions component sensors in diesel engines is that combustion is about twice as lean as spark ignition engines. As such, the oxygen level in the exhaust is often at a level where standard emission sensors do not provide useful information. At the same time, diesel engines may burn too lean for conventional three-way catalysts.

After-treatment is often required to help clean up diesel engine exhaust. After-treatment often includes a "flow through oxidation" catalyst. Typically, such systems do not have any controls. Hydrocarbons, carbon monoxide and most significantly those hydrocarbons that are adsorbed on particulates can sometimes be cleaned up when the conditions are right. Other after-treatment systems include particulate filters. However, these filters must often be periodically cleaned, often by injecting a slug of catalytic material with the fuel. The control of this type of after-treatment may be based on a pressure sensor or on distance traveled, often in an open loop manner.

Practical NOx reduction approaches presently pose a technology challenge. Catalytic converters and particulate traps often require regeneration. Further, air flows, species of concentrations, temperatures, and exhaust gas recirculation should be managed in a manner to control engine emission levels.

SUMMARY

The invention pertains to EGR control so as to lower pollutants in engine exhaust emissions such as NOx and still maintain good power output and efficiency. On some engines, such as diesel engines with turbochargers, an issue arises with the recirculation of exhaust gases from the exhaust system back into the intake system. It is that the pressure of the intake may be greater than the pressure in the exhaust and exhaust gases cannot be recirculated. However, there may be fluctuations of the pressure difference between the intake and the exhaust at some moments where the exhaust pressure is greater that the intake pressure. The present invention may incorporate an EGR valve that captures favorable pressure differences to achieve effective gas recirculation.

DESCRIPTION

Figure 1:
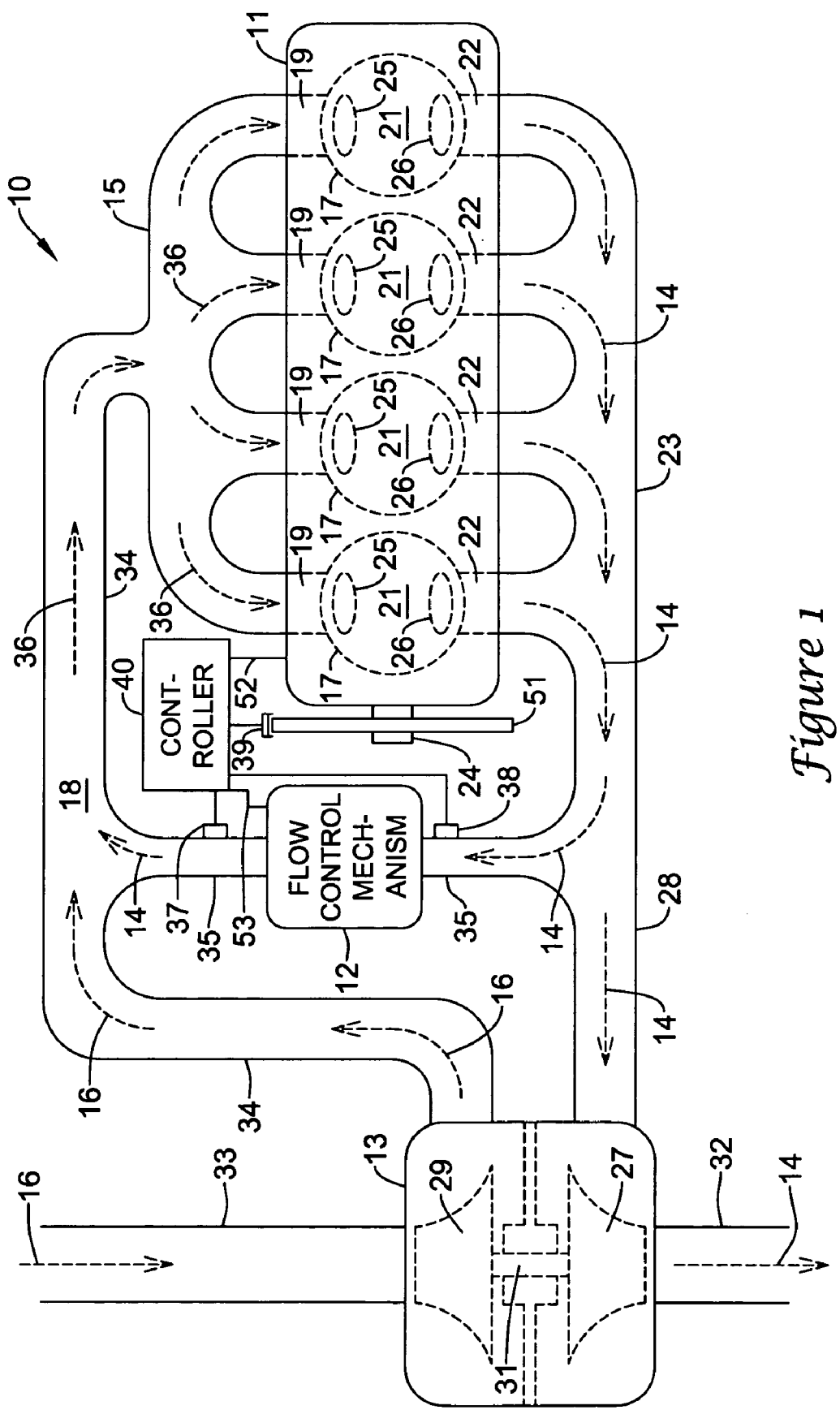
FIG. 1 is a diagram of a turbocharged engine with an EGR system of the present invention.

In the present description, please note that much of the material may be of a hypothetical or prophetic nature even though stated in apparent matter-of-fact language. FIG. 1 shows a system 10 having an engine 11, a turbocharger 13 and an exhaust gas recirculation (EGR) mechanism having a valve 12. Modern engines use exhaust gas recirculation (EGR) to lower the engine-out emissions of NOx emission to meet stringent emissions regulations. The turbocharger 13 may substituted with a supercharger coupled to an intake manifold 15. The supercharger, charger or compressor may be driven by the engine 11 via a belt or other power transferring mechanism. The supercharger may a roots-type or other kind of a charger. EGR is the recirculation of some of the engine 11 exhaust gases 14 back to the engine. The exhaust gas 14 may be combined with fresh air 16 into a mixture 36 before the intake manifold 15 at location 18 or within the intake manifold 15. Then the mixture 36 of fresh air 16 and exhaust gas 14 may enter cylinders 17 via the intake ports 19 at the proper times. At this time a certain amount of fuel may be added to the mixture 36 (via a carburetor or fuel injectors) before entering or after going through the intake valve to the cylinder. This new mixture 36 may enter the respective cylinder during an intake cycle as permitted by an intake valve 25 to cylinder 17. Subsequently, the intake valve may close and a piston 21 in the cylinder compress the mixture 36 up against a head structure (head), not explicitly shown, that is attached to the top of the block containing the cylinder. The head may cap off and seal the cylinder 17 encompassing a volume between the piston and the head. As the piston moves towards its closest position to the head (i.e., top dead center—TDC) the volume of the mixture 36 may decrease and the pressure increase dramatically while the intake valve 25 and an exhaust valve 26 situated in the head are closed thereby maintaining the seal of the volume of the mixture 36. Also, manifolds 15 and 23 may be attached to the head having ports 19 and 22 connecting the manifolds to their respective valves 25 and 26. The valves 25 and 26 may be round but appear oval in the Figure because of their slanted orientation in the head relative to the top of piston 21. Alternatively, valves 25 and 26 may be situated in the top of the cylinder block of the engine along with the respective intake and exhaust manifolds being attached to the block. The intake valve 25 and exhaust valve 26 may be opened and closed by a camshaft (not shown) that is connected to a crankshaft 24. Other mechanisms may be utilized for bringing fuel mixtures to the engine and removing exhaust gases from the engine. At about the piston's closest point to the head, the compressed mixture 36 may ignite (due to the heat of a highly compressed mixture in a diesel engine or the spark of a plug in a gasoline engine) and expand thereby providing much pressure on the piston and pushing the piston away from the head. The piston 21 may be connected to the crankshaft 24 that is rotated by the force of the burning mixture 36 upon the piston, resulting in a power cycle. As the piston approaches its farthest position from the head (i.e., bottom dead center—BDC), the exhaust valve 26 may open and the piston 21 return back up the cylinder 17 and push a burnt mixture or exhaust gas 14 out of the cylinder 17 through the exhaust valve 26 into an exhaust manifold 23 via an exhaust port 22, resulting in an exhaust cycle. The exhaust valve 26 may close and the intake valve open thereby permitting the piston 21 to draw in another mixture 36 along with some fuel, into the cylinder 17 during its next intake cycle as the piston 21 moves down cylinder 17 away from the head. The sequence or intake, compression, power and exhaust cycles may repeat themselves for a given piston 21 and cylinder 17 over the next two rotations of the crankshaft 24. Each of the other pistons 21 and cylinder 17 may proceed through the same process. However, each piston may have its sequence of cycles offset from the other pistons somewhere from one-half to one-and-one-half revolutions of the crankshaft 24. Thus, in the case of the four cylinder engine 11 shown in FIG. 1, there may be one power cycle from one of the pistons 21 during each half revolution of the crankshaft 24. Engine 11 may instead have a different number of cylinders and configuration such an in-line, "V" or opposed cylinder arrangement. The engine may be an internal combustion engine of another kind not having pistons. An example of such engine may be a Wankel engine.

The power of the engine 11 may be increased by compressing the mixture 36, along with the fuel, before it enters the cylinder 17, with a mechanism such as the turbocharger 13. The exhaust gases 14 exiting the engine 11 into manifold 23 may go to a turbine 27 via an exhaust pipe 28. The exhaust gases 14 may turn or spin turbine 27 at a relatively high number of revolutions per minute (rpm). After the exhaust gases 14 pass turbine 27, they may exit the turbo charger via an exhaust pipe 32. Turbine 27 in turn may turn a compressor turbine 29 via a shaft 31. Turbine 29 may draw in fresh air 16 via an intake tube 33 and output into a tube 34 that is connected to the manifold 15. Since the movement of air 16 into tube 34 is much faster than the normal intake of a naturally aspirated engine 11, the air 16 may become compressed as it enters the engine via the manifold 15. If the pressure of compressed air 16 is higher than the pressure of the exhaust gas 14 in pipe 28, then exhaust gas might not go through an open valve 12 and mix with air 16 in tube 34 or manifold 15 to result in an EGR. It is this differential pressure which is of concern here.

EGR may be accomplished by means of a pipe 35, or other device for conveyance, which may connect the exhaust manifold 23 or exhaust pipe 28 to the intake manifold or air intake tube 34. In the EGR flow pipe 35, an on/off valve, a proportional flow valve or a reed valve may be situated in the pipe as the valve 12. When the on/off valve or the proportional flow valve is used, either one may be controlled at a conventional, slow time scale to modulate EGR as a function of load and speed of the crankshaft 24 of engine 11. In both these cases, the exhaust pressure should be greater than the intake pressure to provide an EGR flow in the right direction. The intake pressure and the exhaust pressure may be measured by pressure sensors 37 and 38, respectively. Sensors 37 and 38 may be connected to a controller 40. Signals from the sensors 37 and 38 may be utilized to determine the differential pressure across the flow control mechanism 12. This pressure may also be detected by a differential or delta pressure sensor appropriately situated. The speed or revolution rate or count of the crankshaft may be detected by a speed sensor 39 that is proximate to a flywheel 51 which is attached to crankshaft 24. Sensor 39 may be connected to controller 40. The valve or mechanism 12 may be connected to controller 40 via connection 53. Controller 40 may utilize mathematical models and appropriate control logic, look-up tables, or other schemes, in computing control signals from engine-related parameters for the flow control mechanism 12.

When the reed valve is used, the EGR flow may be dependent on the characteristics of such valve which are not actively controlled. In a well designed highly turbocharged engine 11, such as a diesel engine, the turbocharger 13 may create an intake boost which is higher than the engine exhaust manifold pressure. Thus, in order to induce a flow of exhaust gas 14 from the exhaust manifold 23 or pipe 28 to the intake tube 34 or manifold 15, the time averaged exhaust manifold 23 pressure must be raised above the intake manifold 15 pressure. This may be a problem, because in essence, the intake pressure being higher than the exhaust pressure may negate the positive pumping contribution of the turbocharger 13 and result in a loss of efficiency and fuel economy by the engine. Furthermore, since the exhaust pressure may be pulsing, due to individual cylinder events, pulses from the exhaust may be transmitted to the intake manifold 15. Some of the exhaust gas 14 flow accomplished during pressure pulses may be reversed when the exhaust manifold 23 pressure falls and the intake manifold 15 pressure is momentarily higher then the exhaust. To obtain a net result that is to accomplish the desired EGR rate, the engine may be "back-pressured" by, for example, obstructing the exhaust gas 14 flow in pipe 28, which may result in a fuel economy loss of the engine. Furthermore, as higher levels of EGR are required, the fuel economy penalty increases, and in some cases the engine will not be able to achieve the required EGR levels due to limitations in the turbocharger 13 and engine 11 thermodynamics.

The present device or valve 12 may solve the problem of inducing flow of EGR without increasing back pressure. This may be accomplished by first recognizing that the exhaust gas 14 pressure has pulses, and that the magnitude of these pressure pulses are such that they exceed the intake mixture 36 pressure for certain periods of time. These pressure pulses may be detected by sensor 38. By closing the EGR path in tube or pipe 35 during unfavorable or negative pressure gradients, the present flow control mechanism or valve 12 may prevent reverse EGR flow; however, it then may re-open the path during positive or forward pressure with minimum flow restriction. The benefit is that the engine back-pressure requirement to induce the desired EGR flow may be lowered or eliminated. Thus, EGR may be able to flow "up-hill", i.e., in the appropriate direction from the exhaust manifold 23 or pipe 28 to the intake manifold 15 or tube 34 via tube 35, even where the time averaged intake manifold pressure is higher than the time averaged exhaust manifold pressure. The flow or flow rate of the fluid (e.g., gas 14) may be detected and measured with a flow sensor which may be connected to controller 40 via line 53. The flow sensor may be situated in tube 35 proximate to the flow control mechanism 12 or within the mechanism 12.

Figure 2:
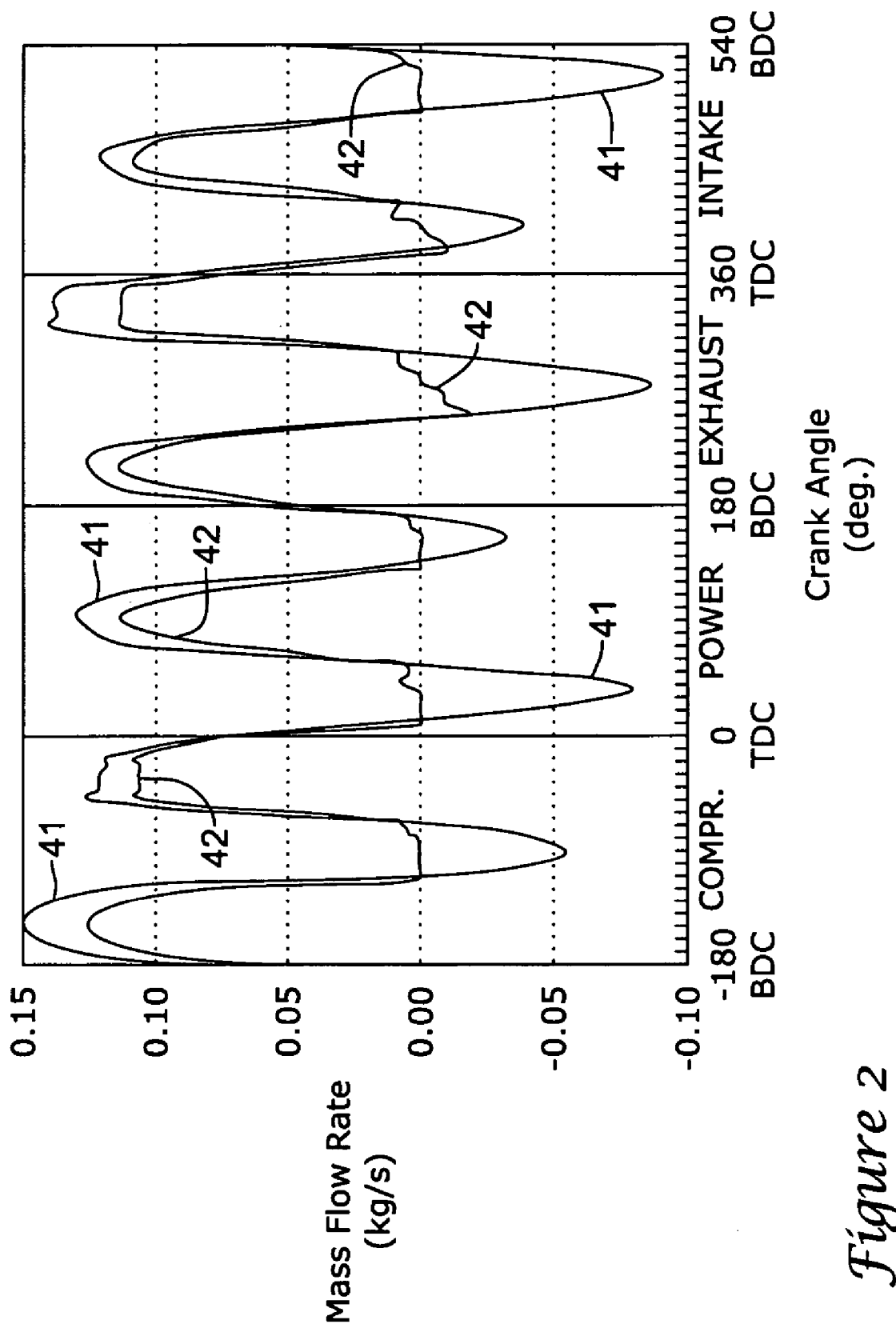
FIG. 2 is a graph comparing an EGR flow of a normal valve with an illustrative example of a valve in the invention.

To accomplish this phenomenon, the present device or valve 12 may have a controllable open "window" area such that the flow area, time of opening and time of closing can be controlled to coincide with the favorable pressure pulses, thus opening only when forward flow will occur and only for a duration compatible with desired EGR flow rate. The valve may very rapidly control a flow of a fluid (i.e., a gas or liquid) with the opening and closing of the window with a moveable mechanical obstruction. FIG. 2 is a graph showing an example of an EGR flow 14 according to curve 41 for a normal EGR valve 12 which may be always open. Curve 42 of FIG. 2 reveals an EGR flow 14 for the present EGR device or valve 12 which is selectively open.

Figure 3:
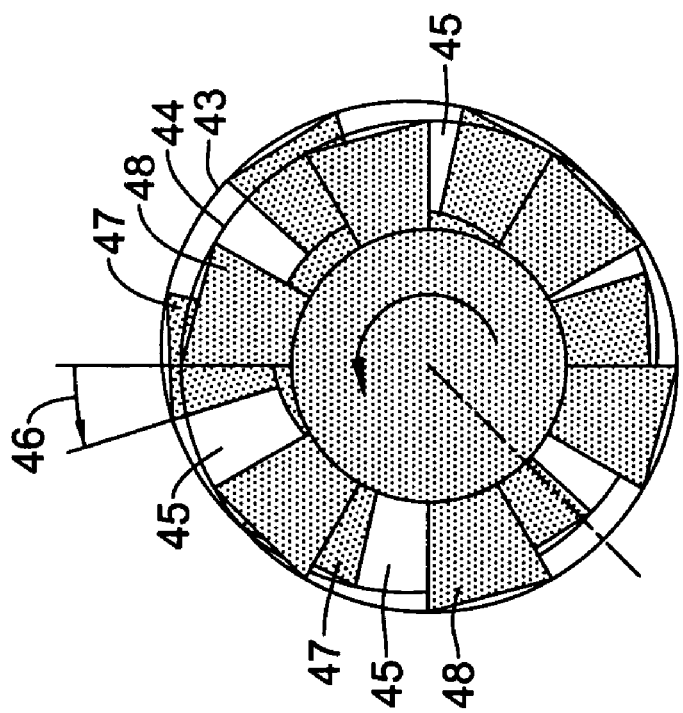
FIG. 3 shows an illustrative example of a valve mechanism.

FIG. 3 shows an illustrative example, among other examples, of the present device or valve 12. Device 12 may have a pair of rotary disks 43 and 44 with one or more window 45 areas per engine cylinder 17. The two disks 43 and 44 may be rotated to change phasing relative to opening and closing events of the engine cylinders 17. Disk 43 may have a number of blades 47 that can overlap with a corresponding number of blades of disk 44. The disks 43 and 44 may rotate at engine speed or other speeds, but may be phased relative to the rotation of the engine crankshaft 24 of engine 11. For instance, there may be a partial overlap of obstructing blades 47 and 48 that result in windows 45. The amount of overlap may be indicated by a phase angle 46 between the disks. The timing of windows 45 may be considered relative to engine events.

Additional configurations of present device 12 may include one window, which operates at N times engine speed, where N is the number cylinders 17 of the engine 11. The window may have a time period when it is open relative to a time it is closed during each cycle of operation. The cycle of operation may a fraction of the engine speed or greater. It may be a pulsating window which may have a period when it is variably partially open. Other configurations of device 12 may provide a variable open flow area "window" that does not have operational cycles or is not pulsing.

Another configuration of device 12 may include a "piston valve" which is configured like the intake ports on a two-stroke engine which has a piston moving such that it opens the port area and provides the flow area "window" for EGR 14 in pipe 35. Such valve may have various modes or styles of operation.

The present system 10 may also include a mechanism for closing or restricting the flow of gas 14 to the main turbine 27, which may be either a VNT (variable nozzle turbine) in the turbocharger 13. There may be a main flow restriction mechanism or valve as in one of the exhaust pipes 28 and 32 or the exhaust manifold 23. Controller 40 may coordinate the restriction of the main turbine flow as required to enhance EGR flow.

The device or valve 12 may have a fast acting mechanism which controls the time of window opening and time of window closing. It may be sufficiently rapid so that each exhaust pulse can have a different open and closing time with valve 12. In FIG. 3, the phase angle 46 of the two rotary disks 43 and 44 may be controlled by rotation of the engine and/or manifold pressures. Window 45 may be formed by blades 47 and 48. Control of the window 45 opening may be determined by a look-up table, mathematical models and appropriate control logic, or other schemes. Control may also involve a pressure difference sensor which detects the pressure difference between the intake manifold 15 and the exhaust manifold 23 so as to control the open window area 45 accordingly to the phase relationship between the rotating disks. The disks 43 and 44 may be rotated by an electric motor, such as a synchronous motor that has its position of revolution under control of a servo-like mechanism which may be connected to a controller. Other forms of power sources may be used to rotate the disks. Rotation may be affected by a connection to the camshaft or a rotator guided by an output from a sensor proximate to the engine crankshaft providing position information. The disks 43 and 44 may be synchronized relative to each other. The disks may also be synchronized to the source of rotation, which may be controlled by a processor.

Figure 4:
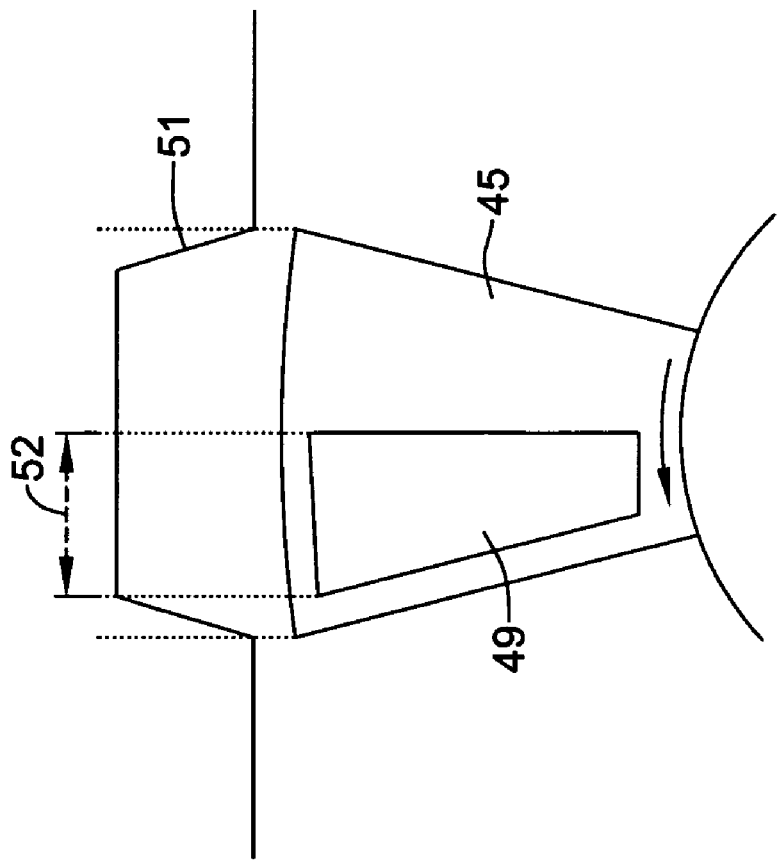
FIG. 4 reveals an illustrative window of a device with a graph of its opening characteristics as an illustrative example of an EGR valve.

FIG. 4 shows an instance of a rotating window 45 which may over lap a fixed orifice 49 in the flow control mechanism 12 if the EGR system. The profile or amount of opening of the window 45 may be indicated by a waveform 51. The amount of the window 45 over the orifice 49 may be indicated by the portion 52 of the waveform. Portion 52 may be smaller if window 45 is made smaller by the blades 47 and 48 coming closer together.

Another EGR control scheme may be to sense the exhaust pressure pulse and adjust the open area profile of window 45 according to the strength of the exhaust pulse. This may provide a control of EGR 14 flow that is as fast as each cylinder's exhaust pulse. This may permit equalization of EGR 14 going to each cylinder 17, or adjustment of the EGR 14 level for each cylinder, as desired, to provide stipulated amounts of exhaust gas to specific cylinders.

The total EGR flow area may be large enough that significant flow can occur in a very short time and then in many cases, the open window period may be less than the total pulse width. Valve 12 may be sufficiently fast to effect a very quick EGR action. Controller 40 may provide or maintain a certain open window area to best utilize the pressure difference pulse. The open window area for the flow control mechanism 12 may be of another valve-type mechanism besides the rotating disks 43 and 44.

An increase in engine back-pressure may be accomplished by closing-off (or reducing), momentarily, the exhaust flow to the turbine with a use of a multiple flow-path EGR valve configuration which coordinates the opening and closing of the flow-path (possibly with another controllable valve-type mechanism) to the turbine 27 and/or the EGR valve 12. These events may be phased or timed with the EGR valve 12 openings such that higher-pressure pulses and thus an EGR flow are obtained as needed.

The valve 12 areas of opening and timing may be controlled on a cylinder by cylinder basis to accomplish a customized EGR flow for each exhaust pulse and to nominally equalize the EGR flow with respect to each pulse. Each cylinder may have an individual pressure sensor (not shown) connected to controller 40 via a connection line 52. This may be particularly useful if there is considerable cycle to cycle variation in the strength of the exhaust pulse which results in cycle to cycle and cylinder to cylinder variation in the exhaust gas recirculation rate. That could mean that if the cylinders are providing different amounts of power, recirculated gas may be provided in adjusted and different amounts in a timely fashion to each of the cylinders so as to result in the same amounts of power from each of the cylinders. This evenness of power from the cylinders may result in a very smooth running and efficient engine.

Since emissions from a given cylinder event may be particularly sensitive to an EGR rate, control of EGR rate as a function of exhaust pressure pulse strength may be particularly beneficial in terms of emissions, economy and power. This control strategy may be strengthened by the use of various other kinds of sensors which may be used to measure shock, vibration, pulses, temperatures, mixtures, and other parameters of the engine system. The signals from these sensors may be input to the processor or controller to provide appropriate signals to the flow control mechanism 12 for effective EGR. EGR flow control may be based on the use of pressure sensors and/or other related sensors together with mathematical models and appropriate control logic. Controller 40 may incorporate the mathematical models and the control logic for EGR flow control based on parameter signals from pressure sensors and/or the other related sensors as noted above.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. A recirculation system for an internal combustion engine comprising:
   an actuatable valve;
   a first tube connected to the valve and to an exhaust mechanism of the internal combustion engine;
   a second tube connected to the valve and to an intake mechanism of the engine;
   a first pressure sensor situated in the first tube and connected to the valve, the first pressure sensor configured to sense pulses in exhaust pressure;
   a second pressure sensor situated in the second tube and connected to the valve; and
   a controller, the controller configured to control a flow area, time of opening and time of closing of the valve.

2. The system of claim 1, wherein:
   if the pressure sensed by the first sensor exceeds the pressure sensed by the second sensor, then the valve is at least partially open; and
   if the pressure sensed by the first sensor is less than the pressure sensed by the second sensor, then the valve is closed.

3. The system of claim 1, wherein:
   the valve comprises a first disk and a second disk;
   the first disk has at least one slot;
   the second disk has at least one slot;
   the first disk and the second disk are rotatable relative to each other; and
   the first disk and second disk may be rotated relative to each other to provide an at least partial opening of the valve or to provide a closure of the valve.

4. A recirculation system comprising:
   an electrically actuated valve having an adjustable window with a flow area, a time of opening, and a time of closing;
   a first tube connected to the valve;
   a second tube connected to the valve;
   a first pressure sensor situated in the first tube;
   a second pressure sensor situated in the second tube; and
   a controller connected to the valve, the first sensor and the second sensor, the controller configured to open the valve window only when a first pressure sensed by the first pressure sensor exceeds a second pressure sensed by the second pressure sensor.

5. The system of claim 4, wherein:
   the first tube is connected to an exhaust mechanism of an internal combustion engine; and
   the second tube is connected to an intake mechanism of the engine.

6. The system of claim 5, wherein:
   if the pressure sensed by the first sensor exceeds the pressure sensed by the second sensor, then the valve becomes at least partially open; and
   if the pressure sensed by the first sensor is less than the pressure sensed by the second sensor, then the valve becomes closed.

7. The system of claim 5, wherein the first pressure sensor is configured to sense the strength of an exhaust pressure pulse, and the controller is configured to adjust the flow area of the valve window according to the strength of the pulse.

8. The system of claim 4,
   the first tube connects the valve to an exhaust mechanism of an internal combustion engine;
   the second tube connects the valve to an intake mechanism of the engine; and
   the valve comprises a first disk and a second disk;
   the first disk has at least one slot;
   the second disk has at least one slot;
   the first disk and the second disk are rotatable relative to each other; and
   the first disk and second disk may be rotated relative to each other to provide an at least partial opening of the valve window or to provide a closure of the valve window.

9. A recirculation system for an internal combustion engine comprising:
   a valve;
   a first tube connected to the valve and to an exhaust mechanism of the engine;
   a second tube connected to the valve and to an intake mechanism of the engine;
   a mechanism, connected to the valve, for sensing pressure pulses in the first tube; and
   a controller connected to the valve and to the mechanism, the controller configured to adjust an opening time and a closing time of the valve for each pressure pulse.

* * * * *